United States Patent [19]

Stier

[11] 3,967,851
[45] July 6, 1976

[54] PUSH-ON PIVOTED SIDE ARM FOR VEHICLE SEAT

[75] Inventor: Paul G. Stier, Muskego, Wis.

[73] Assignee: Universal Oil Products Company, Des Plaines, Ill.

[22] Filed: May 27, 1975

[21] Appl. No.: 583,090

[52] U.S. Cl. ............................. 297/416; 297/417
[51] Int. Cl.² ................................... A47C 7/54
[58] Field of Search .......... 297/416, 417, 414, 411, 297/114

[56] References Cited
UNITED STATES PATENTS

| | | | |
|---|---|---|---|
| 2,661,227 | 12/1953 | Murphy | 297/417 X |
| 3,544,163 | 12/1970 | Krein | 297/417 |
| 3,550,958 | 12/1970 | Krein | 297/414 X |
| 3,807,799 | 4/1974 | Freedman | 297/417 |
| 3,886,611 | 6/1975 | Lammy et al. | 297/417 X |

Primary Examiner—James T. McCall
Attorney, Agent, or Firm—James R. Hoatson, Jr.; Barry L. Clark; William H. Page II

[57] ABSTRACT

Side arm for a vehicle seat may be pushed on or pulled off a mounting bracket attached to the frame of the seat without disturbing the upholstery of either the seat or the arm. The arm has three pins of different lengths which are pushed into three holes in the mounting bracket. The intermediate length pin is mounted near one end of a normally bowed spring plate so as to normally be axially skewed relative to the other pins. During assembly, a chamfered guiding surface on the lead end of the shortest pin engages the edge of a hole in the mounting bracket. As the short pin is pushed through the plate portion of the bracket, it initially forces the skewed pin to move relative to the arm so as to bend the spring and cause the skewed pin to become parallel to the other pins. After the skewed pin has passed through the plate the skewed pin returns under the force of the spring to its skewed position to retain the arm on the bracket.

8 Claims, 6 Drawing Figures

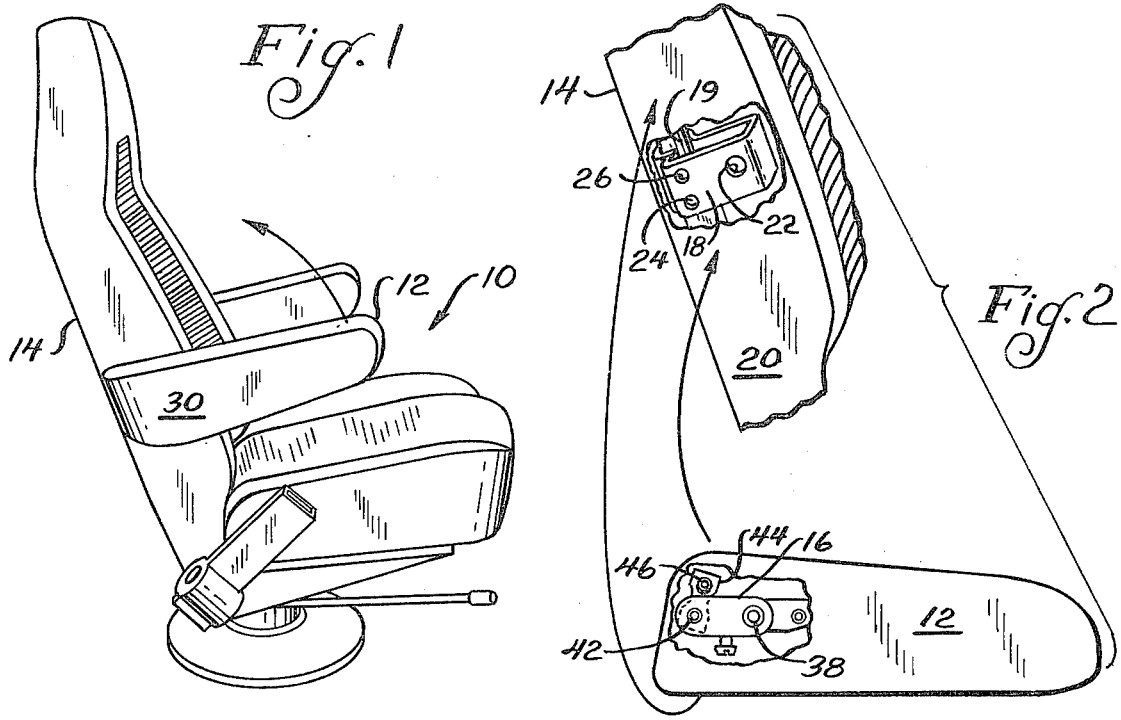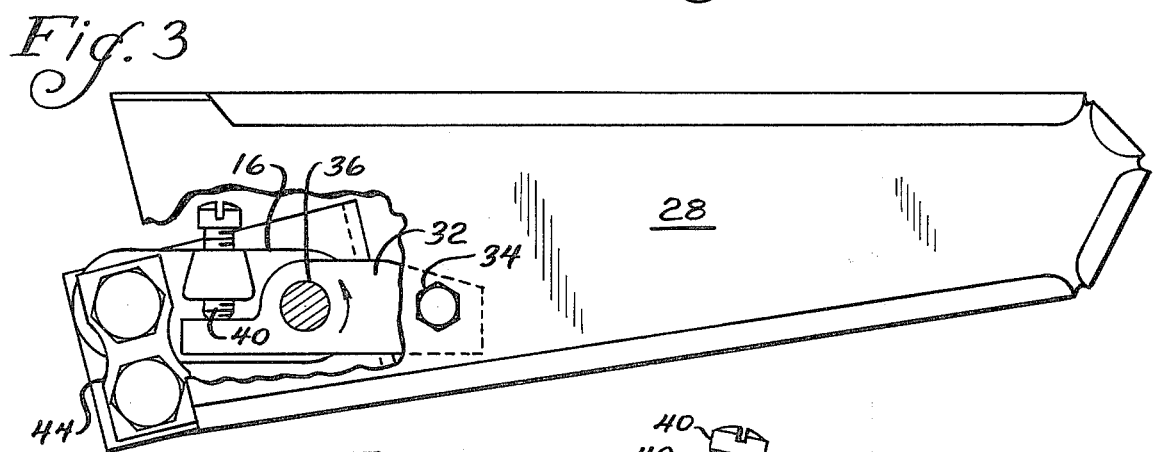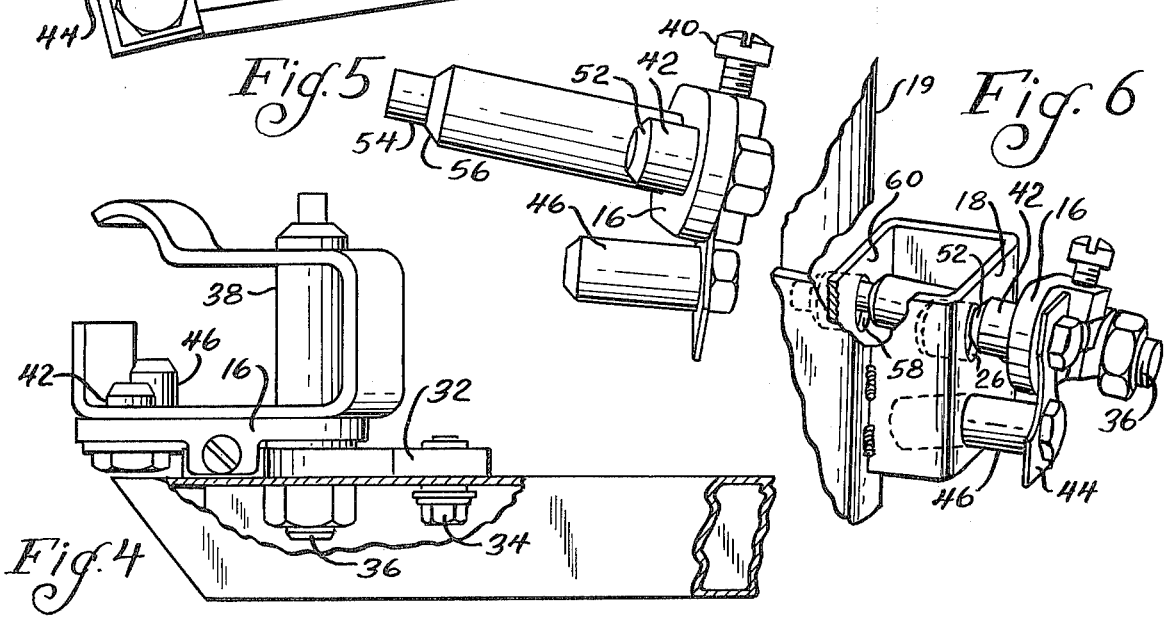

PUSH-ON PIVOTED SIDE ARM FOR VEHICLE SEAT

BACKGROUND OF THE INVENTION

The invention relates to seating and particularly to vehicular seating of the type used in trucks, vans and motor homes. Although such seats are usually sold without side arms, it is common practice to include brackets under the seat back upholstery which are accessible for attaching arms, as evident in U.S. Pat. No. 3,807,799, for example. Many drivers find that side arms increase their comfort, and either have optional side arms installed on a seat when purchased or at a later date. Side arms are particularly useful on suspended seats since they move up and down with the seat and are thus more comfortable to use than fixed armrests mounted on the vehicle doors. They are also quite comfortable on seats that can pivot. In high cab trucks, side arms offer a convenient gripping "handle" which drivers often use to help pull themselves up into the seat.

Since it is desirable that the side arm be pivotable to a vertical storage position when not needed or when it would be in the way, such as when the driver is entering or leaving the seat, it is obvious that the side arm and its supporting bracket on the seat frame must be quite strong. Conventionally, heavy duty side arms which have been strong enough to resist substantial side pulling forces have been attached to the seat by heavy bolts and nuts, necessitating the use of removable upholstery on the arm and requiring a significant amount of installation time.

It would be most desirable to be able to firmly mount a heavy duty side arm to a seat by merely pushing it into position and it is among the objects of the present invention to provide such a side arm.

SUMMARY

The invention comprises a side arm for a seat which includes an elongated mounting plate member pivotally mounted to a frame member located within the arm. The elongated mounting plate member carries a plurality of spaced pins which are adapted to engage a plurality of spaced holes in a fixed seat frame bracket including a pair of spaced plate portions integrally attached to the frame of a seat back member. The seat frame bracket is normally covered by the upholstery on the seat back member but is easily located with a pointed probe so that holes can be made in the upholstery to accommodate the pins. The pins are preferably three in number and of three different lengths. The longest pin is the pivot axis for the arm and is adapted to pass through each of a pair of axially spaced-apart aligned holes formed in the spaced-apart plate portions of the seat bracket. The longest pin has threads at one end which cooperate with a nut to anchor the elongated mounting plate to the seat arm frame. The long pin is mounted on the mounting plate at one end thereof so that its axis remains fixed as the arm is pivoted relative to the mounting plate during use. The arm frame carries a stop member which coacts with an adjustment screw on the elongated mounting plate member to determine the generally horizontal use position of the armrest. The adjustment screw is accessible for adjustment after the arm is installed. The opposite end of the elongated mounting plate carries a short pin whose axis is parallel to the long pin. The short pin must be long enough to start to pass through one plate portion of the seat bracket immediately after the tip of the intermediate pin has passed through the plate portion of the seat bracket. The short pin also acts, after assembly, to prevent rotation of the elongated mounting plate.

A bowed spring plate extends generally transversely from the said opposite end of the elongated mounting plate and is attached thereto by threads on the small pin and a nut. The bowed spring plate carries an intermediate length pin positioned normal thereto at its free end. Since the spring plate is normally bowed, the intermediate pin normally has its axis skewed at about an 8° angle relative to the axes of the shortest pin. The shortest pin has a chamfered tip portion which serves, during assembly to the seat, to contact one side of the hole for the short pin in the seat bracket.

As the arm is pushed toward the seat bracket during assembly the longest pin will first be positioned in a hole in the seat bracket, then the intermediate pin will be positioned in a hole in the seat bracket. As the shortest pin approaches its hole it will, since the skewed pin is already in its hole, contact only one edge of the hole with its chamfered end. The chamfered end of the small pin acts like a cam to initially force the intermediate pin against the restraint of the spring plate to a position where it is aligned with the other pins as the small pin enters its hole. As the intermediate length pin continues to move through the relatively thin seat bracket plate, its now unrestrained tip will be free to return under the force of the bowed spring plate back to its skewed position. In its skewed position it exerts a substantial restraining force after assembly tending to retain the arm on the seat bracket.

By having the three pins of different lengths it is possible for the installer to concentrate on engaging one pin at a time. By positioning the short and intermediate pins equidistantly from the long pivot pin, the elongated mounting plate and the apertured seat bracket can be used to attach either a left arm or a right arm, thus reducing parts inventories. Although the armrest can be pulled away from the seat bracket on the seat frame relatively easily by gripping portions of the arm on each side of the pins, the pulling force which can be applied by grabbing only the free end of the arm only helps to hold the arm on the bracket by causing binding between the pins and the apertures in the bracket.

BRIEF DESCRIPTION OF THE DRAWINGS

FIG. 1 is a perspective view of a seat incorporating the novel side arm;

FIG. 2 is a fragmentary, exploded perspective view showing the relationship between the arm mounting structure on the arm and on the seat back;

FIG. 3 is a broken away side view of the interior of the right hand arm and the underlying support bracket in FIG. 1;

FIG. 4 is a fragmentary, broken away top view of the arm and support bracket structure shown in FIG. 3;

FIG. 5 is a perspective view of the mounting pin support structure; and

FIG. 6 is a perspective, broken away view showing the relative positions of the pins and bracket as the arm is assembled to the support bracket.

DESCRIPTION OF THE PREFERRED EMBODIMENT

Referring to FIG. 1, a seat indicated generally at 10 of the type used in trucks, vans and motor homes is shown as having an upholstered arm 12 mounted for pivotal movement in the direction of the arrow relative to an upholstered seat back member 14.

In FIG. 2, the arm 12 has been pulled away from the seat back 14 and turned over as indicated by the arrows to more clearly show the elongated pin mounting plate 16 which is mounted in the arm 12, and the apertured support bracket 18 which is welded to the frame 19 of the seat back 14. The bracket 18 is normally covered by upholstery material 20 which hides it from view when the seat 10 is sold without arms. The upholstery 20 can be easily punctured when an arm is to be mounted by locating holes 22, 24 and 26 with a probe.

FIG. 3 shows the main metal support frame 28 which has plastic foam material (not shown) and upholstery 30 applied to it to form the finished arm 12 in FIG. 1. A stop member 32 is bolted to the frame 28 by bolt 34 and by the threaded end portion 36 of elongated mounting pin 38. The mounting pin 38 comprises the pivot axis for the arm 12 when it is operatively engaged with aperture 22 in mounting bracket 18. The pin 38 also supports one end of elongated mounting plate 16. An adjustment screw 40 carried by the mounting plate 16 contacts stop plate 32 on the arm 12 and determines the angle of the arm in its position of use. The opposite end of the mounting plate 16 carries a short pin 42 and a slightly bowed spring plate 44 which has an intermediate length pin 46 mounted at its free end at an angle to pin 42 of about 8°.

The manner in which arm 12 is assembled to support bracket 18 is best illustrated in FIG. 6 where the parts are shown in the initial stage of assembly in solid lines and in their fully assembled position in dotted lines. Since the intermediate pin 46 is skewed in a plane which joins pins 46 and 42 and which includes the axis of pin 42, it is possible to cause long pin 38 and skewed pin 46 to enter their respective holes 22 and 24 without applying any force. This is accomplished by simply tilting mounting plate 16 as shown so that pin 38 is angled as it enters its hole and pin 46 is straight. This will cause short pin 42 to be offset from its hole 26 but the tip of tapered or chamfered end portion 52 will engage the upper side of hole 26. The reduced diameter tip portion 54 and the chamfered portion 56 on pin 38 permit the pin 38 to enter hole 58 in the rear plate portion 60 of bracket 18 at an angle. By applying force to the arm 12 to push the pins towards the bracket 18, pins 42 and 38 will be cammed into alignment with their respective holes and bowed spring plate 44 will be straightened out. As additional force is applied to move the pins fully into the holes, as shown in dotted lines, the pin 46 will be free to return to its normal skewed position relative to the other pins under the force of spring plate 44. Although it is possible to remove the arm 12 from the bracket 18 by pulling on the arm on each side of the pins 38, 42, 44, with a substantial amount of force, any ordinary pulling on the free end of the arm only serves to resist removal of the arm since it forces the pins into tighter engagement with the sides of the holes.

I claim as my invention:

1. In combination, a seat frame member including at least one apertured side arm member mounting bracket; at least one side arm member including pin mounting means supporting a plurality of transversely spaced mounting pins positioned in corresponding transversely spaced parallel apertures in the mounting bracket; a first mounting pin being attached to a rigid portion of said pin mounting means; a second mounting pin having a base end carried by a resilient portion of the pin mounting means, the axis of said second mounting pin being normally skewed relative to the axis of said first mounting pin; and a third mounting pin whose axis is parallel to the axis of the first pin, said third pin having a tapered lead end which is sufficiently tapered that it can engage a side edge of a complementary aperture in the mounting bracket on the seat frame whereby application of axial force to said pins during assembly will initially cause said second mounting pin to become parallel to said first and third pins as a leading untapered portion of the third pin passes through said mounting bracket, the force of said resilient portion causing the second pin to reassume its skewed position as the pins are moved sufficiently far into their complementary apertures to cause the base end of the second pin to approach the bracket member.

2. The combination of claim 1 wherein said first, second and third pins are progressively shorter in length.

3. The combination of claim 2 wherein said pin mounting means comprises an elongated plate member having said first pin at one end and said third pin at its other end, said resilient portion being a spring metal plate having said second pin mounted at one of it ends while its other end is rigidly affixed to said elongated plate member.

4. The combination of claim 3 wherein said other end is affixed to said elongated mounting plate by a portion of said third mounting pin.

5. The combination of claim 2 wherein said pin mounting means comprises an elongated plate member having said first pin at one end and said third pin at its other end, said plate member being pivotably mounted to said side arm member; and cooperating stop means on said plate member and said arm member for adjustably limiting the degree of rotation of said plate member relative to said arm member.

6. The combination of claim 5 wherein said stop means includes a threaded stop member carried by said plate member.

7. The combination of claim 3 wherein said first pin is positioned equidistant from said second and third pins.

8. The combination of claim 2 wherein said mounting bracket comprises a pair of spaced plate portions, said second and third pins passing through only the first of said plate portions and said first pin passing through both of said plate portions.

* * * * *